(12) United States Patent
Lee et al.

(10) Patent No.: US 12,518,138 B2
(45) Date of Patent: Jan. 6, 2026

(54) KNOWLEDGE DISTILLATION METHOD BASED ON REGRESSION TASK AND COMPUTING DEVICE FOR EXECUTING THE METHOD

(71) Applicant: SAMSUNG SDS CO., LTD., Seoul (KR)

(72) Inventors: JoonHo Lee, Seoul (KR); Jae-Young Yang, Seoul (KR); Dae-Yeol Shim, Seoul (KR); Mee-Kyoung Park, Seoul (KR); Chang-Hyun Baek, Seoul (KR); Jun-Ho Kang, Seoul (KR); Sang-Bum Cho, Seoul (KR); Chang-Hoon Kim, Seoul (KR); Kyu-Jung Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 895 days.

(21) Appl. No.: 17/826,433

(22) Filed: May 27, 2022

(65) Prior Publication Data

US 2022/0383072 A1    Dec. 1, 2022

(51) Int. Cl.
*G06N 3/045*    (2023.01)
*G06F 18/22*    (2023.01)
*G06N 3/08*    (2023.01)

(52) U.S. Cl.
CPC .............. *G06N 3/045* (2023.01); *G06F 18/22* (2023.01); *G06N 3/08* (2013.01)

(58) Field of Classification Search
CPC ........................... G06N 3/045; G06N 3/00455
See application file for complete search history.

(56) References Cited

U.S. PATENT DOCUMENTS

| | | | |
|---|---|---|---|
| 2019/0286100 A1* | 9/2019 | Mizusawa | G05B 19/4063 |
| 2021/0150330 A1* | 5/2021 | Sharma | G06N 3/08 |
| 2022/0284891 A1* | 9/2022 | Park | G10L 15/22 |
| 2023/0326195 A1* | 10/2023 | Venkataramanan | G06V 10/82 382/157 |

FOREIGN PATENT DOCUMENTS

KR    10-2232138 B1    3/2021

* cited by examiner

*Primary Examiner* — Grace Park
(74) *Attorney, Agent, or Firm* — Sughrue Mion, PLLC

(57) ABSTRACT

A knowledge distillation method based on a regression task according to an embodiment of the present disclosure includes training a first deep neural network model that is a teacher model including a first encoder and a first decoder, constructing a second deep neural network model that is a student model including a second encoder and a second decoder according to a preset constraint of a target system and initializing parameters of the second deep neural network model, performing a first knowledge distillation operation on the second encoder of the second deep neural network model based on the trained first deep neural network model, and performing a second knowledge distillation operation on the second encoder and the second decoder of the second deep neural network model based on the trained first deep neural network model.

17 Claims, 6 Drawing Sheets

KNOWLEDGE DISTILLATION METHOD BASED ON REGRESSION TASK AND COMPUTING DEVICE FOR EXECUTING THE METHOD

CROSS-REFERENCE TO RELATED APPLICATION(S) AND CLAIM OF PRIORITY

This application claims the benefit under 35 USC § 119 of Korean Patent Application No. 10-2021-0068902, filed on May 28, 2021, in the Korean Intellectual Property Office, the entire disclosure of which is incorporated herein by reference for all purposes.

BACKGROUND

1. Field

Embodiments of the present disclosure relate to a technology for a knowledge distillation method.

2. Description of Related Art

When a deep neural network (DNN)-based model is applied to a target system, it is often necessary to make the DNN-based model lightweight in order to meet constraints such as an execution time and a memory usage required in the target system. For such a model lightweight method, knowledge distillation is being utilized along with pruning, quantization, or the like, of DNN parameters.

Among them, the knowledge distillation method uses a method of transferring the knowledge of a teacher model that has been trained to a student model with a smaller structure of the DNN model. The existing knowledge distillation method is mainly used to perform a classification task or an image segmentation task to which it can be directly applied.

On the other hand, a regression task is more affected by label noise caused by human error or measurement error due to the nature of ground truth as continuous data, and as a consequence, when the existing knowledge distillation method is simply applied, the quality of distillation is greatly reduced due to a small amount of outliers produced by the teacher model, resulting in a problem that the performance of the student model is rather degraded.

SUMMARY

Embodiments of the present disclosure is to provide a novel knowledge distillation technology based on a regression task.

In one general aspect, there is provided a knowledge distillation method based on a regression task that is executed in a computing device including one or more processors and a memory storing one or more programs executed by the one or more processors, and the method includes: training a first deep neural network model that is a teacher model including a first encoder and a first decoder; constructing a second deep neural network model that is a student model including a second encoder and a second decoder according to a preset constraint of a target system and initializing parameters of the second deep neural network model; performing a first knowledge distillation operation on the second encoder of the second deep neural network model based on the trained first deep neural network model; and performing a second knowledge distillation operation on the second encoder and the second decoder of the second deep neural network model based on the trained first deep neural network model.

The second deep neural network model may be a lightweight model as compared to the first deep neural network model, and one or more of the number of layers, the number of channels, and the number of parameters of the second deep neural network model may be set to have a certain ratio relationship with one or more of the number of layers, the number of channels, and the number of parameters of the first deep neural network model.

The performing of the first knowledge distillation operation may include: extracting a first feature vector by inputting training data to the first encoder; extracting a second feature vector by inputting training data to the second encoder; and training the second encoder such that a distance between the first feature vector and the second feature vector is minimized. The training of the second encoder may include filtering outliers among first prediction data output from the first deep neural network model.

A first loss function ($L_{enc}$) of the distance between the first feature vector and the second feature vector may be expressed by the following equation.

$$L_{enc}(E_T, E_S; \emptyset_S) = \alpha \text{Dist}(\|E_T - E_S\|) \quad \text{(Equation)}$$

$E_T$: First feature vector output from the first encoder
$E_S$: Second feature vector output from the second encoder
$\emptyset_S$: Parameter of the second encoder
$\alpha$: Outlier filtering coefficient
$\text{Dist}(\|E_T - E_S\|)$: Function to find the distance between the first feature vector ($E_T$) and the second feature vector ($E_S$)

The outlier filtering coefficient ($\alpha$) may be calculated by the following equation based on a scheduling factor and a soft scaling factor.

$$\alpha = \beta_\gamma \quad \text{(Equation)}$$

$\beta$: Scheduling factor
$\gamma$: Soft scaling factor

The scheduling factor may be a real number greater than 0, and be adjusted to a smaller value, starting with an initial value of 1, and the soft scaling factor may be set to be closer to 0 as the first prediction data output by the first deep neural network model is closer to the outlier.

The soft scaling factor ($\gamma$) may be calculated by the following equation.

$$\gamma = \begin{cases} 1, & \|\hat{y}_T - y\| < \|\hat{y}_S - y\| + \delta \\ \frac{\|\hat{y}_S - y\|^2}{\|\hat{y}_T - y\|^2}, & \text{otherwise} \end{cases} \quad \text{(Equation)}$$

$\hat{y}_T$: First prediction data output from the first deep neural network model
$y$: Original data
$\hat{y}_S$: Second prediction data output from the second deep neural network model
$\delta$: Preset constant The training of the second encoder may further include applying a cross attention score between the first deep neural network model and the second deep neural network model to the function to find the distance between the first feature vector and the second feature vector.

The applying of the cross attention score to the function to find the distance between the first feature vector and the second feature vector may include converting a dimension of the second feature vector to be the same as a dimension of the first feature vector, calculating a distance between the first feature vector and the second feature vector, generating a non-local feature vector by applying a 1×1 convolution filter to the first feature vector, calculating a cross attention score by applying a flatten function to the non-local feature vector and then applying a softmax function to a result of the applying, and reflecting the cross-attention score as a weight on the distance between the first feature vector and the second feature vector.

The applying of the cross attention score to the function to find the distance between the first feature vector and the second feature vector may include converting a dimension of the second feature vector to be the same as a dimension of the first feature vector, calculating a distance between the first feature vector and the second feature vector, performing global average pooling on the second feature vector, generating a query vector by applying a 1×1 convolution filter to the second feature vector, applying a flatten function to the first feature vector, calculating a cross attention score by calculating an inner product of the first feature vector to which a flatten function is applied and the query vector and then applying a softmax function to a result of the inner product, and reflecting the cross-attention score as a weight on the distance between the first feature vector and the second feature vector.

The performing of the second knowledge distillation operation may include generating first prediction data by inputting training data into the first deep neural network model, generating second prediction data by inputting training data into the second deep neural network model, calculating a second loss function for a distance between the first prediction data and the second prediction data, calculating a third loss function for a distance between the second prediction data and original data, and training the second deep neural network model such that a sum of the second loss function and the third loss function is minimized.

The training of the second deep neural network model may include filtering outliers among first prediction data output from the first deep neural network model.

The second loss function ($L_{dec}$) for the distance between the first prediction data and the second prediction data may be expressed by the following equation.

$$L_{dec}(\hat{y}_T, \hat{y}_S; \emptyset_S, \theta_S) = \alpha \text{Dist}(\|\hat{y}_T - \hat{y}_S\|)$$ (Equation)

$\hat{y}_T$: First prediction data output from the first decoder
$\hat{y}_S$: Second prediction data output from the second decoder
$\emptyset_S$: Parameter of the second encoder
$\theta_S$: Parameter of the second encoder
y: Original data
α: Outlier filtering coefficient In another general aspect, there is provided a computing device that executes knowledge distillation based on a regression task, the computing device including one or more processors, a memory, and one or more programs, in which the one or more programs are stored in the memory and arranged to be executed by the one or more processors, and the one or more programs includes: an instruction for training a first deep neural network model that is a teacher model including a first encoder and a first decoder; an instruction for constructing a second deep neural network model that is a student model including a second encoder and a second decoder according to a preset constraint of a target system and initializing parameters of the second deep neural network model; an instruction for performing a first knowledge distillation operation on the second encoder of the second deep neural network model based on the trained first deep neural network model; and an instruction for performing a second knowledge distillation operation on the second encoder and the second decoder of the second deep neural network model based on the trained first deep neural network model.

In yet another general aspect, there is provided a knowledge distillation method based on a regression task that is executed in a computing device including one or more processors and a memory storing one or more programs executed by the one or more processors, the method includes: training a first deep neural network model that is a teacher model including a first encoder and a first decoder; constructing a second deep neural network model that is a student model including a second encoder and a second decoder according to a preset constraint of a target system and initializing parameters of the second deep neural network model; and performing a knowledge distillation operation on the second deep neural network model based on the trained first deep neural network model.

The knowledge distillation operation may include calculating a first loss function for a distance between a first feature vector output from the first encoder and a second feature vector output from the second encoder, calculating a second loss function for a distance between first prediction data output from the first deep neural network model and second prediction data output from the second deep neural network model, calculating a third loss function for a distance between the second prediction data and original data, and training the second deep neural network model such that a sum of the first loss function, the second loss function, and the third loss function is minimized.

The training of the second deep neural network model may include filtering outliers among first prediction data output from the first deep neural network model.

In yet another general aspect, there is provided a computing device that executes knowledge distillation based on a regression task, the computing device including one or more processors; a memory; and one or more programs, in which the one or more programs are stored in the memory and arranged to be executed by the one or more processors, and the one or more programs includes: an instruction for training a first deep neural network model that is a teacher model including a first encoder and a first decoder; an instruction for constructing a second deep neural network model that is a student model including a second encoder and a second decoder according to a preset constraint of a target system and initializing parameters of the second deep neural network model; and an instruction for performing a knowledge distillation operation on the second deep neural network model based on the trained first deep neural network model.

The instruction for performing the knowledge distillation operation may include: an instruction for calculating a first loss function for a distance between a first feature vector output from the first encoder and a second feature vector output from the second encoder; an instruction for calculating a second loss function for a distance between first prediction data output from the first deep neural network model and second prediction data output from the second deep neural network model; an instruction for calculating a third loss function for a distance between the second prediction data and original data; and an instruction for training the second deep neural network model such that a sum of the first loss function, the second loss function, and the third loss function is minimized.

The instruction for training the second deep neural network model may include an instruction for filtering outliers among first prediction data output from the first deep neural network model.

DETAILED DESCRIPTION

Hereinafter, specific embodiments of the present disclosure will be described with reference to the accompanying drawings. The following detailed description is provided to assist in a comprehensive understanding of the methods, devices and/or systems described herein. However, the detailed description is only for illustrative purposes and the present disclosure is not limited thereto.

In describing the embodiments of the present disclosure, when it is determined that detailed descriptions of known technology related to the present disclosure may unnecessarily obscure the gist of the present disclosure, the detailed descriptions thereof will be omitted. The terms used below are defined in consideration of functions in the present disclosure, but may be changed depending on the customary practice or the intention of a user or operator. Thus, the definitions should be determined based on the overall content of the present specification. The terms used herein are only for describing the embodiments of the present disclosure, and should not be construed as limitative. Unless expressly used otherwise, a singular form includes a plural form. In the present description, the terms "including", "comprising", "having", and the like are used to indicate certain characteristics, numbers, steps, operations, elements, and a portion or combination thereof, but should not be interpreted to preclude one or more other characteristics, numbers, steps, operations, elements, and a portion or combination thereof.

Further, it will be understood that, although the terms first, second, etc. may be used herein to describe various elements, these elements should not be limited by these terms. These terms may be used to distinguish one element from another element. For example, without departing from the scope of the present disclosure, a first element could be termed a second element, and similarly, a second element could be termed a first element.

Figure 1:
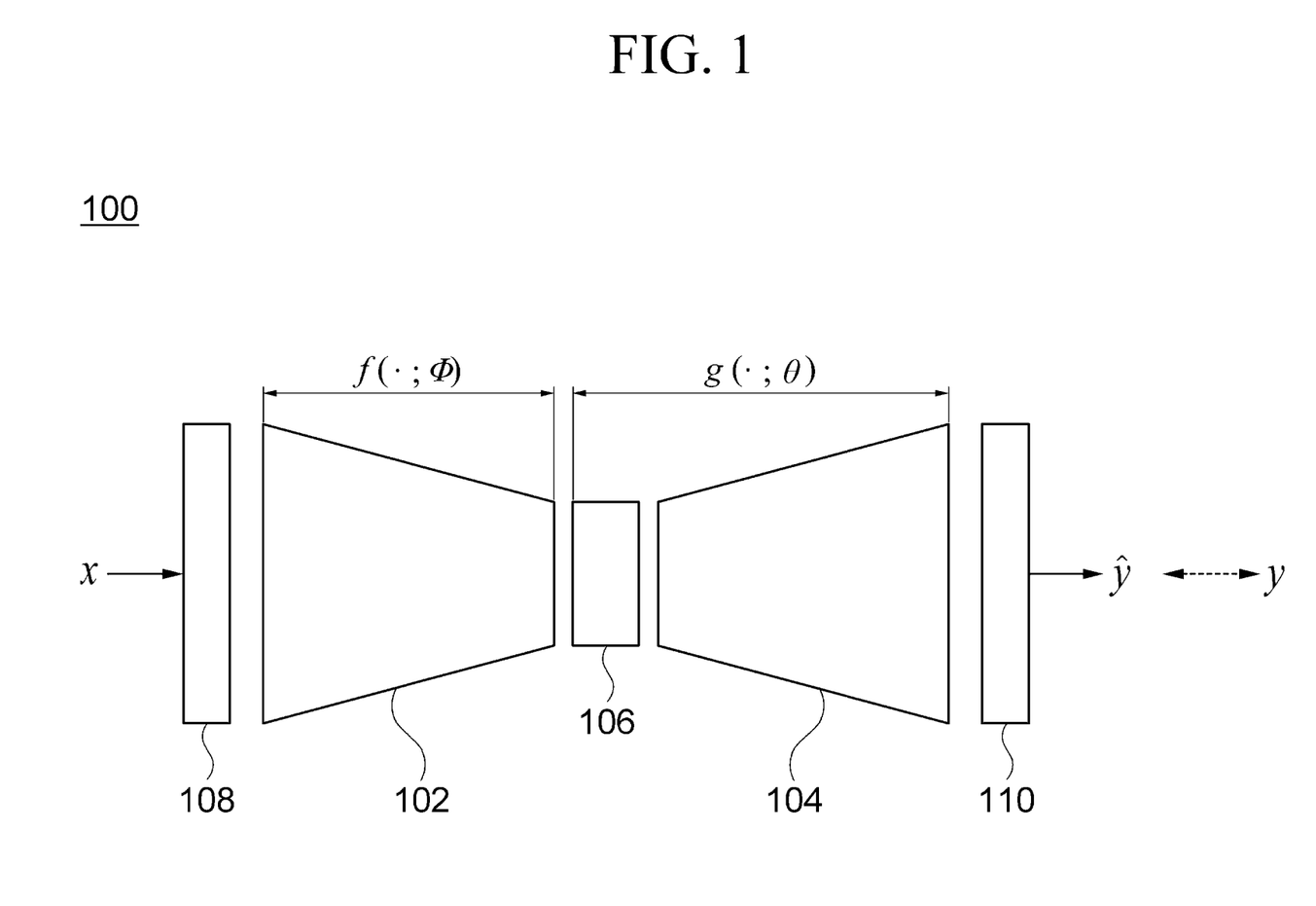
FIG. 1 is a diagram schematically showing a deep neural network model for knowledge distillation based on a regression task according to an embodiment of the present disclosure.

FIG. 1 is a diagram schematically showing a deep neural network model for knowledge distillation based on a regression task according to an embodiment of the present disclosure. Referring to FIG. 1, a deep neural network model 100 may include an encoder 102 and a decoder 104.

The encoder 102 may be constituted by a neural network for receiving input data x and extracting a feature vector from the input data x. The deep neural network model 100 is for performing a regression task, and as the input data x, data related to the regression task (that is, data having a continuity, for example, an audio signal, a spectral signal, a sine signal, a cosine signal, or the like) is used. Hereinafter, it will be described as an example that the input data x is a speech signal having noise.

The decoder 104 may be constituted by a neural network for outputting prediction data 9 based on a feature vector output from the encoder 102. When a speech signal having noise is input to the encoder 102, the decoder 104 may output a predicted speech 9 based on a feature vector output from the encoder 102. In this case, the deep neural network model may be trained such that the difference between the predicted speech 9 output from the decoder 104 and an original speech y is minimized.

Here, the neural network constituting the encoder 102 may be expressed by $f(\bullet;\emptyset)$, and the neural network constituting the decoder 104 may be expressed as $g(\bullet;\theta)$. In this case, $\emptyset$ represents a parameter of the neural network constituting the encoder 102, and $\theta$ represents a parameter of the neural network constituting the decoder 104.

The encoder 102 and the decoder 104 may have a symmetric structure. For example, when a convolution layer of the encoder 102 is stacked in a {64, 128, 256} channel structure, a transposed convolution layer may be stacked in a {256, 128, 64} channel structure in the decoder 104. However, the structure is not limited thereto, and depending on the nature of the regression task, the decoder 104 may be constituted only by a simple dense layer, and the decoder 104 as a whole becomes a null value and only the encoder 102 may be used.

Meanwhile, the deep neural network model 100 may further include a processing module 106 capable of processing temporal information (e.g., time-series information about the input data x) between the encoder 102 and the decoder 104. For example, the processing module 106 may include a recurrent neural network (RNN), such as a long short-term memory (LSTM).

In addition, the deep neural network model 100 may further include transform modules 108 and 110 that are provided symmetrically to each other at an input end (front end of the encoder 102) and an output end (rear end of the decoder 104), respectively. In the case of a regression task handling a signal, transform modules 108 and 110 may be formed at the input and output ends of the deep neural network model, respectively, in order to change the modality of the signal. Unlike the encoder 102 and the decoder 104, the transform modules 108 and 110 have no parameters to learn.

Figure 2:
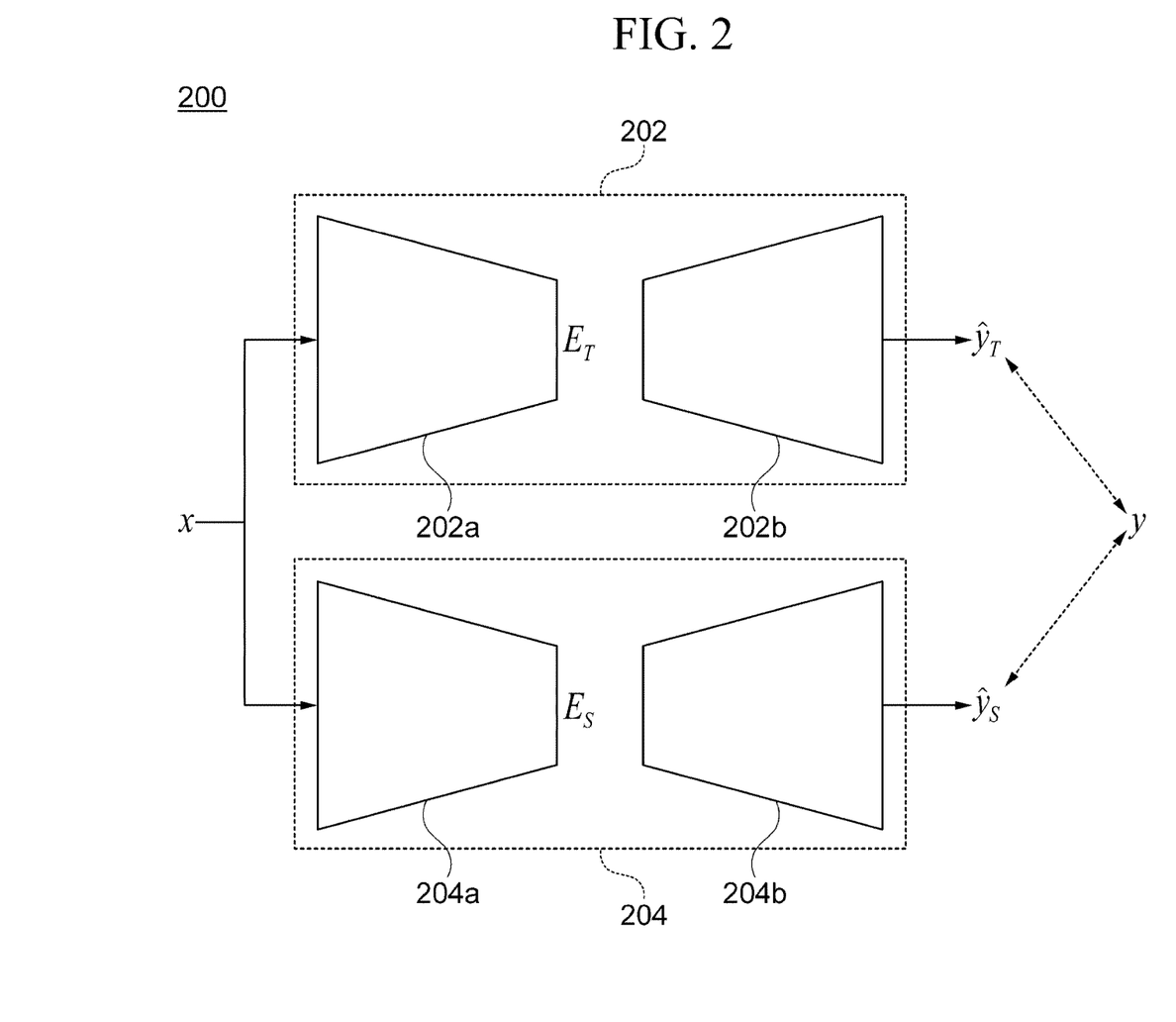
FIG. 2 is a diagram showing the configuration of a knowledge distillation device based on a regression task according to an embodiment of the present disclosure.

FIG. 2 is a diagram showing the configuration of a knowledge distillation device based on a regression task according to an embodiment of the present disclosure.

Referring to FIG. 2, a knowledge distillation apparatus 200 includes a first deep neural network model 202 and a second deep neural network model 204. The first deep neural network model 202 may be a teacher model, and the second deep neural network model 204 may be a student model. That is, the knowledge distillation apparatus 200 may be a computing device for transferring the knowledge of the first deep neural network model 202 that has been trained to the second deep neural network model 204.

The first deep neural network model 202 may include a first encoder 202a and a first decoder 202b. The second deep neural network model 204 may include a second encoder 204a and a second decoder 204b. Here, for convenience of description, the processing module 106 and the transform modules 108 and 110 are omitted.

Figure 3:
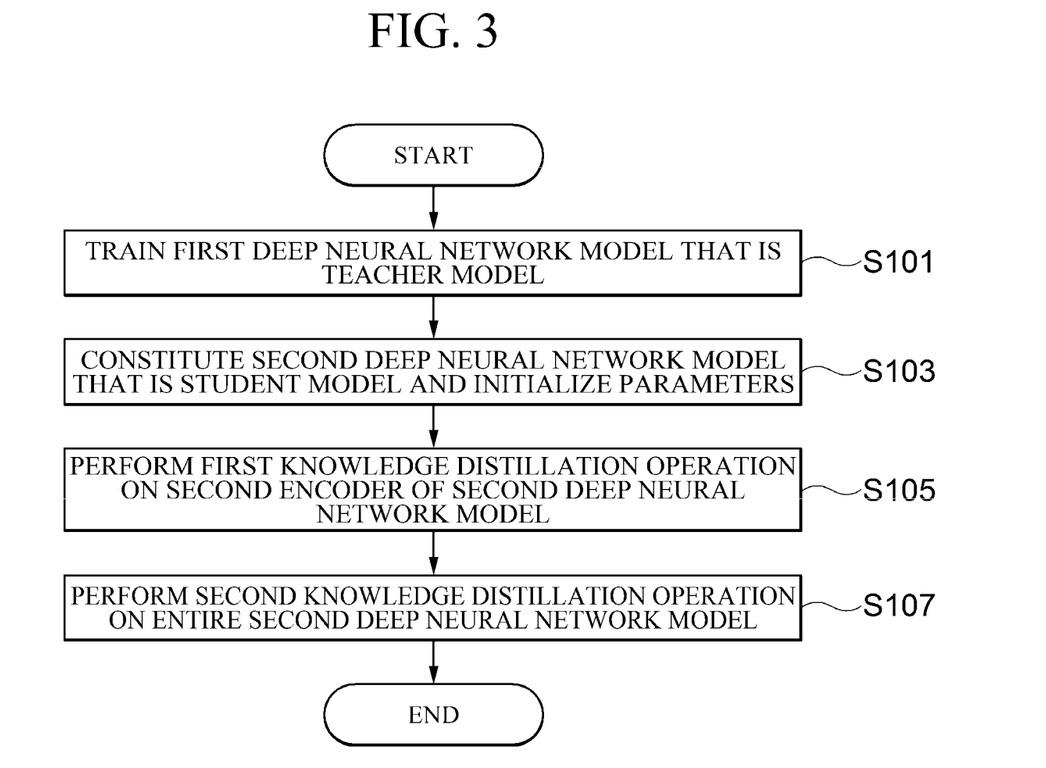
FIG. 3 is a flowchart showing a knowledge distillation method based on a regression task according to an embodiment of the present disclosure.

FIG. 3 is a flowchart showing a knowledge distillation method based on a regression task according to an embodiment of the present disclosure. In the illustrated flowchart, the method is divided into a plurality of steps; however, at least some of the steps may be performed in a different order, performed together in combination with other steps, omitted, performed in subdivided steps, or performed by adding one or more steps not illustrated.

Referring to FIG. 3, the knowledge distillation apparatus 200 trains the first deep neural network model 202, which is the teacher model (S101). Specifically, the first encoder 202a and the first decoder 202b of the first deep neural network model 202 may be trained using the loss function on the training data.

Here, the first encoder 202a may take the training data x as an input and extract a first feature vector. The first decoder 202b may output prediction data $\hat{y}_T$ based on the first feature vector output from the first encoder 202a. In this case, the knowledge distillation apparatus 200 may train the first deep neural network model 202 such that the difference between the prediction data $\hat{y}_T$ output from the first decoder 202b and original data y (that is, ground truth) is minimized. When the first deep neural network model 202 has been trained, a parameter $\emptyset_T$ of the first encoder 202a and a parameter OT of the first decoder 202b are fixed.

Next, the knowledge distillation apparatus 200 constitutes the second deep neural network model 204, which is the student model, according to constraints (e.g., execution time, memory usage, or the like) of a target system to which the second deep neural network model 204 is to be applied, and initializes the parameters of the second deep neural network model 204 (S103). At this time, the second deep neural network model 204 is in a state in which only the structure of the neural network is formed, and each parameter in the neural network is in an initialized state.

Specifically, the second deep neural network model 204 is a lightweight model as compared with the first deep neural network model 202. Here, the lightweight model may mean that one or more of the number of layers constituting the second deep neural network model 204, the number of channels of the second deep neural network model 204, the number of parameters included in the second deep neural network model 204, the amount of computation of the second deep neural network model 204, the resource usage of the second deep neural network model 204, and the power usage of the second deep neural network model 204 are smaller than those of the first deep neural network model 202.

The number of layers, the number of channels, and the number of parameters of the second deep neural network model 204 may be set to have a constant ratio relationship with the number of layers, the number of channels, and the number of parameters of the first deep neural network model 202. For example, the number of layers, the number of channels, and the number of parameters of the second deep neural network model 204 may have a ratio of 1 to N (N is a real number of 1 or more) with the number of layers, the number of channels, and the number of parameters of the first deep neural network model 202.

Next, the knowledge distillation apparatus 200 performs a first knowledge distillation operation on the second encoder 204a of the second deep neural network model 204 (S105).

Specifically, the knowledge distillation apparatus 200 may extract the first feature vector by inputting the training data x to the first encoder 202a of the first deep neural network model 202, and may extract a second feature vector by inputting the training data x to the second encoder 204a of the second deep neural network model 204. The knowledge distillation apparatus 200 may train the second encoder 204a such that the difference (distance) between the first feature vector and the second feature vector is minimized. Here, the first knowledge distillation operation may be expressed by the following Equation 1.

$$\min_{\emptyset_S} L_{enc}(E_T, E_S; \emptyset_S) \quad \text{(Equation 1)}$$

$E_T$: First feature vector output from the first encoder
$E_S$: Second feature vector output from the second encoder
$\emptyset_S$: Parameter of the second encoder
$L_{enc}$: First loss function for the distance between the first feature vector and the second feature vector
$\min_{\emptyset_S}$: Function that minimizes $\emptyset_S$ Meanwhile, an outlier may be included in a value output from the first deep neural network model 202, and in this case, distortion may occur in a value of the first loss function $L_{enc}$. Accordingly, in the disclosed embodiment, an outlier filtering coefficient for filtering the outlier may be applied to the first loss function $L_{enc}$. In this case, the first loss function $L_{enc}$ may be expressed by the following Equation 2.

$$L_{enc}(E_T, E_S; \emptyset_S) = \alpha \text{Dist}(\|E_T - E_S\|) \quad \text{(Equation 2)}$$

$\alpha$: Outlier filtering coefficient
$\text{Dist}(\|E_T - E_S\|)$: Function to find the distance between the first feature vector ($E_T$) and the second feature vector ($E_S$)

Here, as a function Dist to find the distance, a function to find an L1 distance may be used, or a function to find an L2 distance may be used. In addition, both the function to find the L1 distance and the function to find the L2 distance may be used as shown in the following Equation 3.

$$\text{Dist} \leftarrow m\|E_T - E_S\|_1 + n\|E_T - E_S\|_2^2 \quad \text{(Equation 3)}$$

m: Weight for the L1 distance
n: Weight for the L2 distance

Here, the outlier filtering coefficient $\alpha$ may be calculated based on a scheduling factor and a soft scaling factor. For example, the outlier filtering coefficient $\alpha$ may be calculated through the following Equation 4.

$$\alpha = \beta \gamma \quad \text{(Equation 4)}$$

$\beta$: Scheduling factor
$\gamma$: Soft scaling factor

In Equation 4, the scheduling factor $\beta$ is a real number greater than 0, and may be set to reduce the weight of knowledge transferred from the teacher model to the student model by adjusting it to a smaller value starting with an initial value of 1.

Further, the soft scaling factor $\gamma$ may have a value closer to 0 as the output of the first deep neural network model 202 is closer to the outlier. The soft scaling factor $\gamma$ may be calculated through the following Equation 5.

$$\gamma = \begin{cases} 1, & \|\hat{y}_T - y\| < \|\hat{y}_S - y\| + \delta \\ \dfrac{\|\hat{y}_S - y\|^2}{\|\hat{y}_T - y\|^2}, & \text{otherwise} \end{cases} \quad \text{(Equation 5)}$$

$\hat{y}_T$: First prediction data output from the first deep neural network model y: Original data $\hat{y}_S$: Second prediction data output from the second deep neural network model δ: Preset constant According to Equation 5, when the difference between the prediction data (hereinafter, refer to as first prediction data) output from the first deep neural network model 202 and the original data is smaller than a value obtained by adding the preset constant to the difference between the prediction data (hereinafter, refer to as second prediction data) output from the second deep neural network model 204 and the original data, the probability that the first prediction data is an outlier is low, and thus the soft scaling factor γ becomes 1.

On the other hand, when the difference between the first prediction data and the original data is greater than or equal to the value obtained by adding the preset constant to the difference between the second prediction data and the original data, the soft scaling factor (γ) has a value proportional to the difference between the second prediction data and the original data and the difference between the first prediction data and the original data. In this case, as the first prediction data is closer to the outlier, the soft scaling factor γ has a value closer to 0, and thus the outlier output from the first deep neural network model 202 may be filtered. In this case, the quality of the knowledge distillation may be improved.

In addition, the knowledge distillation apparatus 200 may apply a cross attention score to the function Dist to find a distance. The cross attention score is a weight for determining which part of the output of the first deep neural network model 202 to focus on and apply to the second deep neural network model 204. In this case, the first loss function $L_{enc}$ may be expressed by the following Equation 6.

$$\text{Dist} \leftarrow \lambda \cdot \text{Dist} \qquad \text{(Equation 6)}$$

λ: Cross attention score

Figure 4:
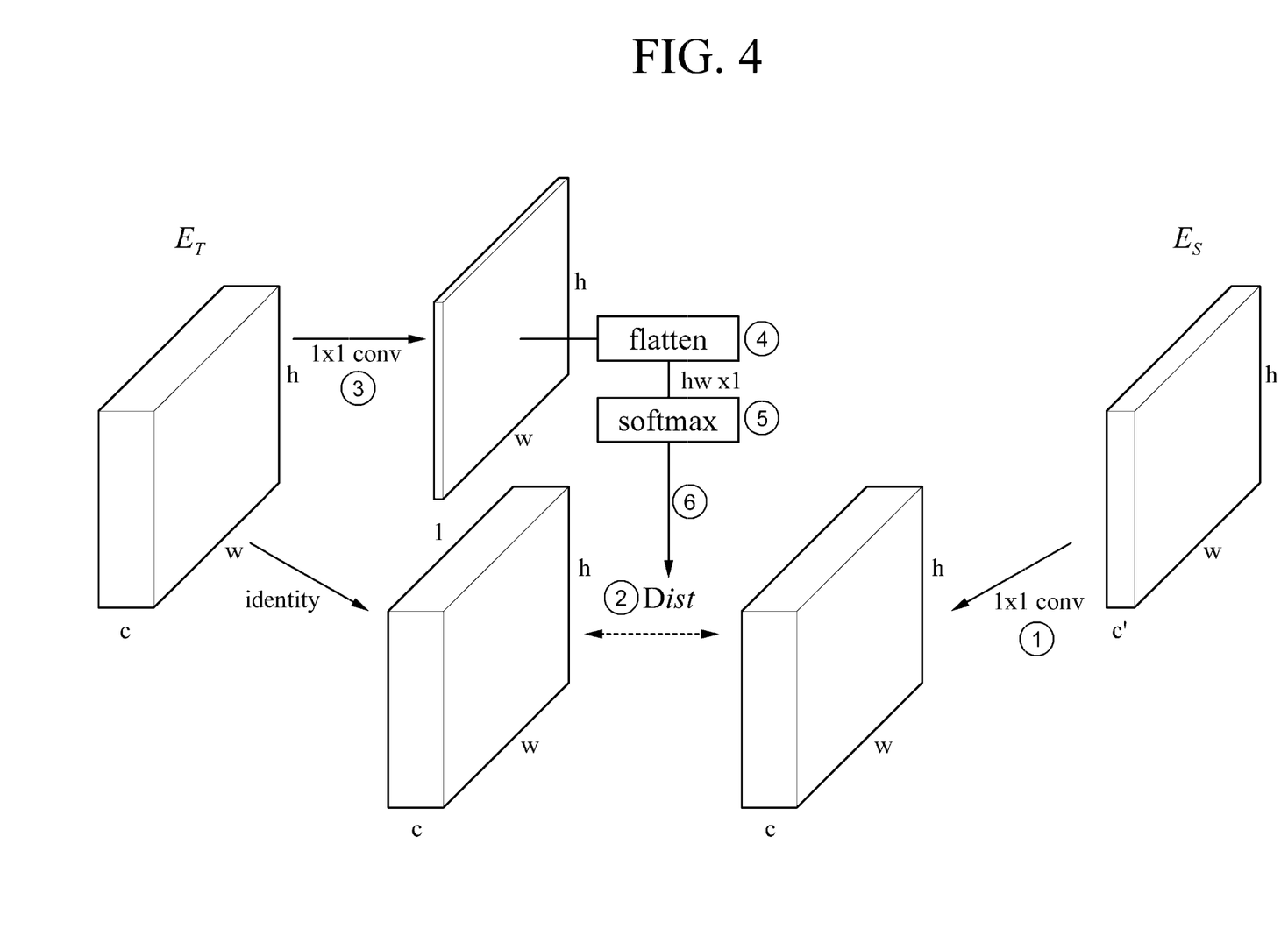
FIG. 4 is a diagram schematically showing a process according to an embodiment of applying a cross attention score to a function to find a distance in the present disclosure.

FIG. 4 is a diagram schematically showing a process according to an embodiment of applying a cross attention score to the function Dist to find a distance in the present disclosure. Referring to FIG. 4, the first feature vector output from the first encoder 202a may be a vector in the form of h (height)×w (width)×c (channel). In the disclosed embodiment, "vector" may be used to include "tensor" in its meaning.

In addition, the second feature vector output from the second encoder 204a may be a vector in the form of h (height)×w (width)×c' (channel). In this case, c' is a value smaller than c. Here, since the second deep neural network model 204 is a lightweight model as compared to the first deep neural network model 202, the dimensions of the second feature vector and the first feature vector are different.

Accordingly, the knowledge distillation apparatus 200 may convert the dimension of the second feature vector to match the dimension of the first feature vector. For example, the knowledge distillation apparatus 200 may perform 1×1 convolutional transformation to convert the dimension of the second feature vector to h×w×c, which is the same as that of the first feature vector (①).

Next, the knowledge distillation apparatus 200 finds a distance (that is, Dist(∥$E_T$−$E_S$∥)) between the first feature vector $E_T$ and the second feature vector $E_S$ (②). Next, the knowledge distillation apparatus 200 generates a non-local feature vector by applying a 1×1 convolution filter to the first feature vector (③). In this case, the 1×1 convolution filter serves as a static query. That is, the 1×1 convolution filter may be applied to the first feature vector as a static query of an attention mechanism. The non-local feature vector may be a vector in the form of h×w×1.

Next, the knowledge distillation apparatus 200 applies a flatten function to the non-local feature vector to convert it into a vector in the form of hw×1 (④), and then applies the softmax function to the converted vector to calculate the cross attention score ((④)). Next, the knowledge distillation apparatus 200 reflects the cross attention score as a weight in the distance (Dist) between the first feature vector and the second feature vector (⑥).

Figure 5:
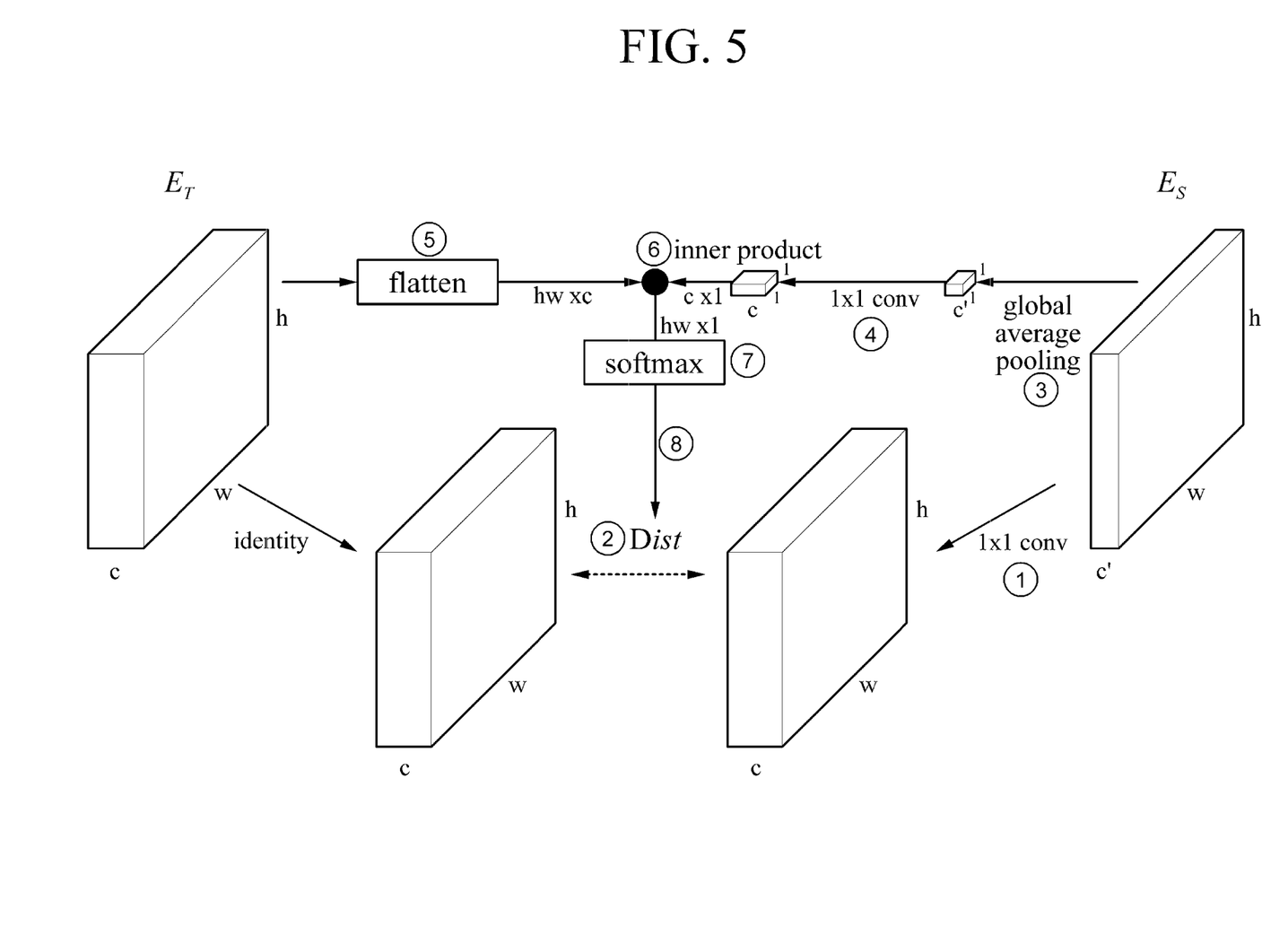
FIG. 5 is a diagram schematically showing a process according to an embodiment of applying a cross attention score to a function to find a distance in the present disclosure.

FIG. 5 is a diagram schematically showing a process according to an embodiment of applying a cross attention score to the function Dist to find a distance in the present disclosure. Referring to FIG. 5, the knowledge distillation apparatus 200 performs 1×1 convolutional transformation to convert the dimension of the second feature vector to h×w×c, which is the same as that of the first feature vector (①).

Next, the knowledge distillation apparatus 200 finds a distance (that is, Dist(∥$E_T$−$E_S$∥)) between the first feature vector $E_T$ and the second feature vector $E_S$ (②). Next, the knowledge distillation apparatus 200 performs global average pooling on the second feature vector (③). In this case, the second feature vector is converted from a 3D vector of h×w×c' to a 3D vector of 1×1×c'.

Next, the knowledge distillation apparatus 200 applies a 1×1 convolution filter to the second feature vector (that is, 1×1×c') to generate a query vector (④). In this case, the query vector may be a 3D vector (that is, 1×1×c) having the same channel as the channel c of the first feature vector. Here, since the query vector is generated from the second feature vector, it is possible to dynamically reflect change factors according to individual input data characteristics.

Next, the knowledge distillation apparatus 200 converts the first feature vector into a 2D vector by applying a flatten function to the first feature vector (⑤). That is, by applying the flatten function to the first feature vector in the form of h×w×c, it is possible to convert the first feature vector into a 2D vector in the form of hw×c. In this case, it is possible to reshape the query vector into a 2D vector in the form of c×1.

Next, the knowledge distillation apparatus 200 calculates a cross attention score (⑦) by calculating a vector in the form of hw×1 by calculating the inner product of the first feature vector (hw×c) and the query vector (c×1) (⑥), and then applying the softmax function to the vector in the form of hw×1. Next, the knowledge distillation apparatus 200 reflects the cross attention score as a weight in the distance (Dist) between the first feature vector and the second feature vector (⑧).

Referring back to FIG. 3, the knowledge distillation apparatus 200 performs a second knowledge distillation operation on the entire second deep neural network model 204 (S107).

Specifically, the knowledge distillation apparatus 200 may generate the first prediction data by inputting the training data x into the first deep neural network model 202. In this case, the first encoder 202a may extract the first feature vector from the training data x, and the first decoder 202b may output the first prediction data based on the first feature vector.

In addition, the knowledge distillation apparatus 200 may generate the second prediction data by inputting the training data x into the second deep neural network model 204. In this case, the second encoder 204a may extract the second feature vector from the training data x, and the second decoder 204b may output the second prediction data based on the second feature vector.

The knowledge distillation apparatus 200 may obtain a second loss function $L_{dec}$ for the distance between the first prediction data and the second prediction data. Further, the knowledge distillation apparatus 200 may obtain a third loss function $L_{target}$ for the distance between the second prediction data and the original data. The knowledge distillation apparatus 200 may train the second deep neural network model 204 such that the sum of the second loss function $L_{dec}$ and the third loss function $L_{target}$ is minimized. Here, the second knowledge distillation operation may be expressed by the following Equation 7.

$$\min_{\emptyset_S,\theta_S}\{L_{dec}(\hat{y}_T,\hat{y}_S;\emptyset_S,\theta_S)+L_{target}(y,\hat{y}_S;\emptyset_S,\theta_S)\} \quad \text{(Equation 7)}$$

$\hat{y}_T$: First prediction data output from the first decoder
$\hat{y}_S$: Second prediction data output from the second decoder
$\emptyset_S$: Parameter of the second encoder
$\theta_S$: Parameter of the second encoder
y: Original data
$\min_{\emptyset_S,\theta_S}$: Function that minimizes $\emptyset_S$ and $\theta_S$ In this case, a weight may be assigned to at least one of the second loss function $L_{dec}$ and the third loss function $L_{target}$.

Further, an outlier filtering coefficient may be applied to remove an outlier generated in the value of the second loss function $L_{dec}$. In this case, the second loss function $L_{dec}$ may be expressed by the following Equation 8.

$$L_{dec}(\hat{y}_T,\hat{y}_S;\emptyset_S,\theta_S)=\alpha\text{Dist}(\|\hat{y}_T-\hat{y}_S\|) \quad \text{(Equation 8)}$$

α: Outlier filtering coefficient

Here, the outlier filtering coefficient α may be calculated as in Equations 4 and 5.

According to the embodiments disclosed herein, by generalizing the structure of a deep neural network model for knowledge distillation that performs a regression task, it is possible to perform knowledge distillation through two-step learning for any regression task (a first knowledge distillation operation and a second knowledge distillation operation, thereby making it possible to secure stable performance.

In addition, by applying an outlier filtering coefficient capable of filtering out outliers that occur in the first deep neural network model, which is the teacher model, it is possible to increase the quality of knowledge distillation, and, as a result, to avoid any performance degradation when the second deep neural network model trained by knowledge distillation performs the regression task.

Meanwhile, it has been described here that the two-step learning of the first knowledge distillation operation and the second knowledge distillation operation is performed; however, the learning is not limited thereto, and the first knowledge distillation operation and the second knowledge distillation operation may be learned at once according to the number of layers of the neural network. The knowledge distillation operation of the knowledge distillation apparatus 200 may be expressed by the following Equation 9.

$$\min_{\emptyset_S,\theta_S}\{L_{enc}(E_T,E_S;\emptyset_S)+L_{dec}(\hat{y}_T,\hat{y}_S;\emptyset_S,\theta_S)+L_{target}(y,\hat{y}_S;\emptyset_S,\theta_S)\} \quad \text{(Equation 9)}$$

Here, a weight may be assigned to at least one of the first loss function $L_{enc}$, the second loss function $L_{dec}$, and the third loss function $L_{target}$.

Figure 6:
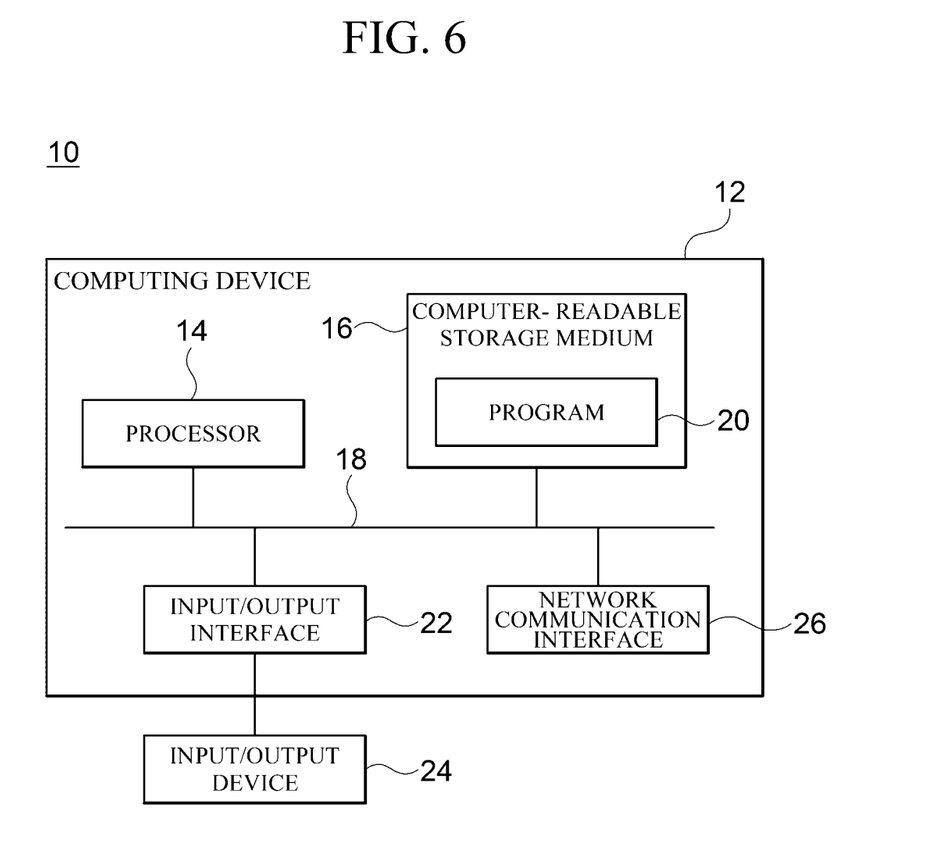
FIG. 6 is a block diagram exemplarily illustrating a computing environment that includes a computing device suitable for use in exemplary embodiments.

FIG. 6 is a block diagram exemplarily illustrating a computing environment 10 that includes a computing device suitable for use in exemplary embodiments. In the illustrated embodiment, each component may have different functions and capabilities in addition to those described below, and additional components may be included in addition to those described below.

The illustrated computing environment 10 includes a computing device 12. In an embodiment, the computing device 12 may be the knowledge distillation apparatus 200.

The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which may be configured to cause, when executed by the processor 14, the computing device 12 to perform operations according to the exemplary embodiments.

The computer-readable storage medium 16 is configured to store computer-executable instructions or program codes, program data, and/or other suitable forms of information. A program 20 stored in the computer-readable storage medium 16 includes a set of instructions executable by the processor 14. In an embodiment, the computer-readable storage medium 16 may be a memory (a volatile memory such as a random-access memory, a non-volatile memory, or any suitable combination thereof), one or more magnetic disk storage devices, optical disc storage devices, flash memory devices, other types of storage media that are accessible by the computing device 12 and may store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 via the input/output interface 22. The exemplary input/output device 24 may include a pointing device (a mouse, a trackpad, or the like), a keyboard, a touch input device (a touch pad, a touch screen, or the like), a voice or sound input device, input devices such as various types of sensor devices and/or imaging devices, and/or output devices such as a display device, a printer, an interlocutor, and/or a network card. The exemplary input/output device 24 may be included inside the computing device 12 as a component constituting the computing device 12, or may be connected to the computing device 12 as a separate device distinct from the computing device 12.

According to the embodiments disclosed herein, by generalizing the structure of a deep neural network model for knowledge distillation that performs a regression task, it is possible to perform knowledge distillation through two-step learning for any regression task (a first knowledge distillation operation and a second knowledge distillation operation, thereby making it possible to secure stable performance.

In addition, by applying an outlier filtering coefficient capable of filtering out outliers that occur in the first deep neural network model, which is the teacher model, it is possible to increase the quality of knowledge distillation, and, as a result, to avoid any performance degradation when the second deep neural network model trained by knowledge distillation performs the regression task.

Although the representative embodiments of the present disclosure have been described in detail as above, those skilled in the art will understand that various modifications may be made thereto without departing from the scope of the present disclosure. Therefore, the scope of rights of the present disclosure should not be limited to the described embodiments, but should be defined not only by the claims set forth below but also by equivalents of the claims.

What is claimed is:

1. A knowledge distillation method based on a regression task that is executed in a computing device including:
one or more processors; and
a memory storing one or more programs executed by the one or more processors, the method comprising:
training a first deep neural network model that is a teacher model including a first encoder and a first decoder;
constructing a second deep neural network model that is a student model including a second encoder and a second decoder according to a preset constraint of a target system and initializing parameters of the second deep neural network model;
performing a first knowledge distillation operation on the second encoder of the second deep neural network model based on the trained first deep neural network model; and
performing a second knowledge distillation operation on the second encoder and the second decoder of the second deep neural network model based on the trained first deep neural network model,
wherein the performing of the first knowledge distillation operation includes:
extracting a first feature vector by inputting training data to the first encoder;
extracting a second feature vector by inputting training data to the second encoder; and
training the second encoder such that a first loss function ($L_{enc}$) of a distance between the first feature vector and the second feature vector is minimized,
wherein an outlier filtering coefficient for filtering an outlier among first prediction data output from the first deep neural network model is applied to the first loss function.

2. The method of claim 1, wherein the second deep neural network model is a lightweight model as compared to the first deep neural network model, and
one or more of the number of layers, the number of channels, and the number of parameters of the second deep neural network model is set to have a certain ratio relationship with one or more of the number of layers, the number of channels, and the number of parameters of the first deep neural network model.

3. The method of claim 1, wherein the first loss function ($L_{enc}$) of the distance between the first feature vector and the second feature vector is expressed by the following equation $$L_{enc}(E_T, E_S; \varnothing_S) = \alpha \text{Dist}(\|E_T - E_S\|) \qquad \text{(Equation)}$$

$E_T$: First feature vector output from the first encoder
$E_S$: Second feature vector output from the second encoder
$\varnothing_S$: Parameter of the second encoder
$\alpha$: Outlier filtering coefficient
$\text{Dist}(\|E_T - E_S\|)$: Function to find the distance between the first feature vector ($E_T$) and the second feature vector ($E_S$).

4. The method of claim 3, wherein the outlier filtering coefficient ($\alpha$) is calculated by the following equation based on a scheduling factor and a soft scaling factor $$\alpha = \beta_\gamma \qquad \text{(Equation)}$$

$\beta$: Scheduling factor
$\gamma$: Soft scaling factor.

5. The method of claim 4, wherein the scheduling factor is a real number greater than 0, and is adjusted to a smaller value, starting with an initial value of 1, and
the soft scaling factor is set to be closer to 0 as the first prediction data output by the first deep neural network model is closer to the outlier.

6. The method of claim 5, wherein
the soft scaling factor ($\gamma$) is calculated by the following equation $$\gamma = \begin{cases} 1, & \|\hat{y}_T - y\| < \|\hat{y}_S - y\| + \delta \\ \dfrac{\|\hat{y}_S - y\|^2}{\|\hat{y}_T - y\|^2}, & \text{otherwise} \end{cases} \qquad \text{(Equation)}$$

$\hat{y}_T$: First prediction data output from the first deep neural network model
$y$: Original data
$\hat{y}_S$: Second prediction data output from the second deep neural network model
$\delta$: Preset constant.

7. The method of claim 3, wherein the training of the second encoder further includes applying a cross attention score between the first deep neural network model and the second deep neural network model to the function to find the distance between the first feature vector and the second feature vector.

8. The method of claim 7, wherein the applying of the cross attention score to the function to find the distance between the first feature vector and the second feature vector includes:
converting a dimension of the second feature vector to be the same as a dimension of the first feature vector;
calculating the distance between the first feature vector and the second feature vector;
generating a non-local feature vector by applying a 1×1 convolution filter to the first feature vector;
calculating a cross attention score by applying a flatten function to the non-local feature vector and then applying a softmax function to a result of the applying; and
reflecting the cross attention score as a weight on the distance between the first feature vector and the second feature vector.

9. The method of claim 7, wherein the applying of the cross attention score to the function to find the distance between the first feature vector and the second feature vector includes:
converting a dimension of the second feature vector to be the same as a dimension of the first feature vector;
calculating the distance between the first feature vector and the second feature vector;
performing global average pooling on the second feature vector;
generating a query vector by applying a 1×1 convolution filter to the second feature vector;
applying a flatten function to the first feature vector;
calculating a cross attention score by calculating an inner product of the first feature vector to which the flatten function is applied and the query vector and then applying a softmax function to a result of the inner product; and reflecting the cross attention score as a weight on the distance between the first feature vector and the second feature vector.

10. The method of claim 1, wherein the performing of the second knowledge distillation operation includes:

generating first prediction data by inputting training data into the first deep neural network model;

generating second prediction data by inputting training data into the second deep neural network model;

calculating a second loss function for a distance between the first prediction data and the second prediction data;

calculating a third loss function for a distance between the second prediction data and original data; and training the second deep neural network model such that a sum of the second loss function and the third loss function is minimized.

11. The method of claim 10, wherein the training of the second deep neural network model includes filtering outliers among first prediction data output from the first deep neural network model.

12. The method of claim 11, wherein the second loss function ($L_{dec}$) for the distance between the first prediction data and the second prediction data is expressed by the following equation $$L_{dec}(\hat{y}_T, \hat{y}_S; \varnothing_S, \theta_S) = \alpha \text{Dist}(\|\hat{y}_T - \hat{y}_S\|) \quad \text{(Equation)}$$

$\hat{y}_T$: First prediction data output from the first decoder
$\hat{y}_S$: Second prediction data output from the second decoder
$\varnothing_S$: Parameter of the second encoder
$\theta_S$: Parameter of the second encoder
y: Original data
α: Outlier filtering coefficient.

13. A knowledge distillation method based on a regression task that is executed in a computing device including:

one or more processors; and a memory storing one or more programs executed by the one or more processors, the method comprising:

training a first deep neural network model that is a teacher model including a first encoder and a first decoder;

constructing a second deep neural network model that is a student model including a second encoder and a second decoder according to a preset constraint of a target system and initializing parameters of the second deep neural network model; and performing a knowledge distillation operation on the second deep neural network model based on the trained first deep neural network model, wherein the knowledge distillation operation comprises:

calculating a first loss function for a distance between a first feature vector output from the first encoder and a second feature vector output from the second encoder; and training the second deep neural network model based on the first loss function, wherein an outlier filtering coefficient for filtering an outlier among first prediction data output from the first deep neural network model is applied to the first loss function.

14. The method of claim 13, wherein the knowledge distillation operation further includes:

calculating a second loss function for a distance between first prediction data output from the first deep neural network model and second prediction data output from the second deep neural network model;

calculating a third loss function for a distance between the second prediction data and original data; and training the second deep neural network model such that a sum of the first loss function, the second loss function, and the third loss function is minimized.

15. A computing device that executes knowledge distillation for performing a regression task, the computing device comprising:

one or more processors;
a memory; and
one or more programs, wherein the one or more programs are stored in the memory and arranged to be executed by the one or more processors, the one or more programs including:

an instruction for training a first deep neural network model that is a teacher model including a first encoder and a first decoder;

an instruction for constructing a second deep neural network model that is a student model including a second encoder and a second decoder according to a preset constraint of a target system and initializing parameters of the second deep neural network model; and an instruction for performing a knowledge distillation operation on the second deep neural network model based on the trained first deep neural network model, wherein the instruction for performing the knowledge distillation operation comprises:

an instruction for calculating a first loss function for a distance between a first feature vector output from the first encoder and a second feature vector output from the second encoder; and an instruction for training the second deep neural network model based on the first loss function, wherein an outlier filtering coefficient for filtering an outlier among first prediction data output from the first deep neural network model is applied to the first loss function.

16. The computing device of claim 15, wherein the instruction for performing the knowledge distillation operation includes:

an instruction for calculating a second loss function for a distance between first prediction data output from the first deep neural network model and second prediction data output from the second deep neural network model;

an instruction for calculating a third loss function for a distance between the second prediction data and original data; and an instruction for training the second deep neural network model such that a sum of the first loss function, the second loss function, and the third loss function is minimized.

17. The computing device of claim 16, wherein the instruction for training the second deep neural network model includes an instruction for filtering outliers among first prediction data output from the first deep neural network model.

* * * * *